US010445178B2

(12) United States Patent
Guddekoppa

(10) Patent No.: US 10,445,178 B2
(45) Date of Patent: Oct. 15, 2019

(54) METHODS AND SYSTEMS FOR CONTROLLING REDUNDANT ARRAY OF INEXPENSIVE DISKS (RAID) OPERATIONS

(71) Applicant: Samsung Electronics Co., Ltd., Suwon-si, Gyeonggi-do (KR)

(72) Inventor: Vishak Guddekoppa, Karnataka (IN)

(73) Assignee: Samsung Electronics Co., Ltd., Gyeonggi-do (KR)

(*) Notice: Subject to any disclaimer, the term of this patent is extended or adjusted under 35 U.S.C. 154(b) by 139 days.

(21) Appl. No.: 15/605,107

(22) Filed: May 25, 2017

(65) Prior Publication Data

US 2018/0060170 A1 Mar. 1, 2018

(30) Foreign Application Priority Data

Aug. 24, 2016 (IN) .............................. 201641028801

(51) Int. Cl.
| G06F 11/00 | (2006.01) |
| G06F 11/10 | (2006.01) |
| G06F 1/30 | (2006.01) |
| G06F 11/14 | (2006.01) |
| G06F 3/06 | (2006.01) |

(52) U.S. Cl.
CPC ............ G06F 11/1076 (2013.01); G06F 1/30 (2013.01); G06F 3/0604 (2013.01); G06F 3/0616 (2013.01); G06F 3/0659 (2013.01); G06F 3/0685 (2013.01); G06F 3/0688 (2013.01); G06F 11/1446 (2013.01)

(58) Field of Classification Search
CPC .... G06F 1/30; G06F 11/0727; G06F 11/0793; G06F 11/1402; G06F 11/1446; G06F 3/0616; G06F 3/0659; G06F 3/0685; G06F 3/0688
See application file for complete search history.

(56) References Cited

U.S. PATENT DOCUMENTS

| 8,745,320 B2 | 6/2014 | Gupta et al. | |
| 2012/0059978 A1* | 3/2012 | Rosenband | ........... G06F 3/0613 |
| | | | 711/103 |
| 2014/0325117 A1* | 10/2014 | Canepa | ............... G06F 12/0246 |
| | | | 711/103 |

(Continued)

*Primary Examiner* — Marc Duncan
(74) *Attorney, Agent, or Firm* — Harness, Dickey & Pierce, P.L.C.

(57) ABSTRACT

Methods, apparatuses, systems, and/or non-transitory computer readable media for controlling Redundant Array of Inexpensive Disks (RAID) operations by a flash storage device are described. The method includes receiving Input/Output (I/O) attribute information of a RAID operation in an I/O command from a host device. Further, the I/O attribute information is stored in a RAID meta store area reserved on the flash storage device. Further, the method includes flushing the I/O attribute information along with meta data of the flash storage device in the RAID meta store area to a flash of the flash storage device on occurrence of a sudden power off. Furthermore, the method includes transferring the I/O attribute information, flushed to the flash, to the host device for performing data correction for one or more flash storage devices in the system based on the I/O attribute information received from each flash storage device.

9 Claims, 5 Drawing Sheets

(56) References Cited

U.S. PATENT DOCUMENTS

2015/0378948 A1* 12/2015 Parikh ................ G06F 13/1694
710/308
2016/0054942 A1*  2/2016 Yu ............................ G06F 1/30
714/718
2016/0306552 A1* 10/2016 Liu ........................ G06F 3/061

* cited by examiner

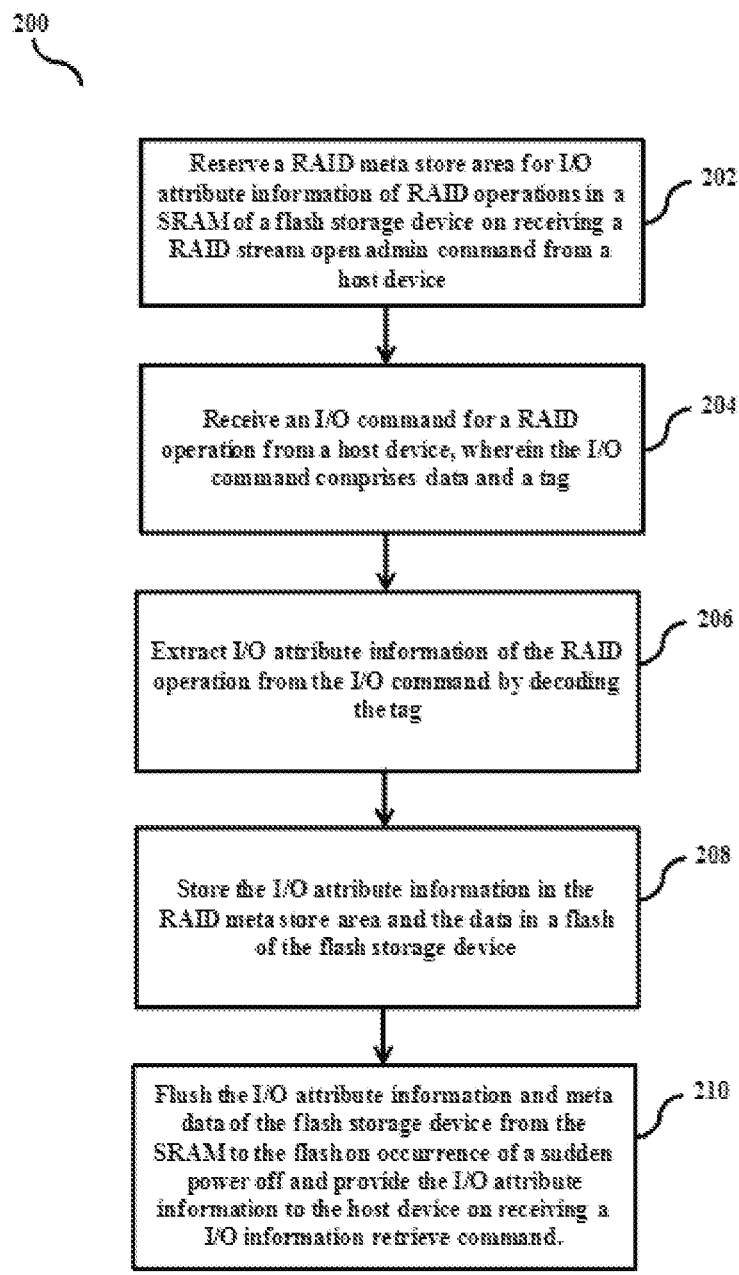

METHODS AND SYSTEMS FOR CONTROLLING REDUNDANT ARRAY OF INEXPENSIVE DISKS (RAID) OPERATIONS

CROSS-REFERENCE TO RELATED APPLICATION

This U.S. non-provisional application claims the benefit of priority under 35 U.S.C. § 119 to Indian Patent Application No. 201641028801, filed on Aug. 24, 2016 in the Indian Intellectual Property Office, the entire contents of which are herein incorporated by reference.

BACKGROUND

1. Field

Various example embodiments herein generally relate to the field of RAID (Redundant Array of Independent Disks) storage systems and more particularly to a RAID controller.

2. Description

Exponential rise in Internet services has led to an exponential increase in the volume of data required to support these Internet services. Management of such large volumes of data demands high requirements for capacity, performance, and availability of storage systems. Traditionally, storage systems or storage arrays use hard disks. More recently, non-volatile flash storage devices, such as Solid State Devices (SSDs), have been increasingly deployed in storage systems and storage arrays, particularly for enterprise-level storage system setups. To handle the low performance and high failure rate of hard disk drives during actual applications and/or actual use, hard disk drives often use a Redundant Array of Independent Disks (RAID) mode. The RAID uses multiple disk drives to enable data protection via data mirroring or parity. Because the data being stored is spread across all drives in the RAID system, it enables the rebuilding of any failing unit with reference to the other units. Thus, RAID improves the Input/Output (I/O) performance of the storage system and the reliability of the host, such as a server or a workstation. The RAID is implemented using a RAID controller. Traditional storage devices, like Serial Advanced Technology Attachment (SATA) devices, deploy a hardware RAID controller.

However, implementing hardware RAID controller deployment for newer storage devices, such as next generation Solid State Devices (SSDs), Non-Volatile Dual In-line Memory Module-F (NVDIMM-F), and the like, is more difficult and/or not available because these storage devices are physically located in DIMM slots and controlled by a processor memory controller. Thus, realization of RAID for SSDs is only available through a software RAID controller that can be implemented as a feature of an Operating System (OS). With the deployment of RAID controller within the OS, currently a module such as a device driver handles the issue of a sudden power off event, where the device driver is required to write operation information before performing the actual operation. This results in two I/O operations to storage devices. A first operation is the writing information of the operation (read or write) being performed. A second operation is the actual operation (reading from or writing to) the storage devices. Thus, every I/O operation results in an additional I/O operation which effectively lowers the I/O performance. Also, additional writes may result in a lesser (e.g., reduced) life span of the SSD storage device, since all SSDs use NAND memory as the backend storage component and. NAND memory blocks may only be written to a finite number of times.

SUMMARY

The principal object of various example embodiments herein is to provide methods, apparatuses, systems, and/or non-transitory computer readable media for controlling Redundant Array of Inexpensive Disks (RAID) operations by a flash storage device, wherein the flash storage device receives Input/Output (I/O) attribute information of a RAID operation in a I/O command from a host device and stores the received I/O attribute information in a RAID meta store area reserved on the flash storage device.

Another object of at least one example embodiment herein is to provide methods, apparatuses, systems, and/or non-transitory computer readable media for flushing the I/O attribute information stored in the RAID meta store area along with meta data of the flash storage device to a flash of the flash storage device on occurrence of a sudden power off event.

Another object of at least one example embodiment herein is to provide methods, apparatuses, systems, and/or non-transitory computer readable media for transferring the I/O attribute information, flushed to the flash, to the host device on receiving an I/O attribute information retrieve command from the host device for carrying out data correction after the sudden power off event.

In view of the foregoing, at least one example embodiment herein provides a method for controlling Redundant Array of Inexpensive Disks (RAID) operations performed by a flash storage device. The method comprises receiving an Input/Output (I/O) command for a RAID operation from a host device, the I/O command including data and a tag. Further, the method comprises extracting I/O attribute information of the RAID operation from the received I/O command based on the tag received in the I/O command. Furthermore, the method comprises storing the I/O attribute information in a RAID meta store area of the flash storage device, the RAID meta store area stored on Static Random Access Memory (SRAM) included in the flash storage device, storing the data of the I/O command on flash memory included in the flash storage device, and performing an I/O operation using the flash memory based on the tag and the data.

Various example embodiments further disclose a flash storage device for controlling Redundant Array of inexpensive Disks (RAID) operations. The flash storage device comprises Static Random Access Memory (SRAM), flash memory, and a host controller configured to receive an Input/Output (I/O) command for a RAID operation from a host device, the I/O command including data and a tag. Further, the host controller is configured to extract I/O attribute information of the RAID operation from the received I/O command based on the tag received in the I/O command. Furthermore, the host controller is configured to store the I/O attribute information in RAID meta store area of the Static Random access Memory (SRAM), store the data in the flash memory, and perform an I/O operation using the flash memory based on the decoded tag and the data.

Various example embodiments further disclose a host device for Redundant Array of Inexpensive Disks (RAID) operations in at least one flash storage device. The host device comprises a memory having computer readable instructions related to a device driver stored thereon, and at least one processor configured to execute the device driver computer readable instructions to transmit a RAID stream open admin command to the flash storage device, the RAID stream open admin command providing instructions to reserve a RAID meta store area in Static Random Access Memory (SRAM) of the flash storage device, transmit an Input/Output (I/O) command to the flash storage device corresponding to a RAID operation, the I/O command including data and a tag, the tag including I/O attribute information to be stored in the RAID meta store area, and receive results of the I/O command performed by the flash storage device, the I/O command performed based on the tag and the data.

Various example embodiments further disclose a method for operating a plurality of flash storage devices in a RAID configuration. The method comprises reserving a RAID meta store area on a volatile memory section on each of the plurality of flash storage devices in the RAM configuration, receiving a RAID input/output (I/O) operation from at least one host device, the I/O operation including tag information and data, determining I/O attribute information based on the tag information, the I/O attribute information including metadata related to the RAID I/O operation, writing the determined I/O attribute information to the reserved RAID meta store area on at least one of the plurality of flash storage devices, and performing the RAID I/O operation on non-volatile memory section included in at least one of the flash storage devices based on the tag information and the data.

These and other aspects of the example embodiments herein will be better appreciated and understood when considered in conjunction with the following description and the accompanying drawings. If should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

The example embodiments of this invention are illustrated in the accompanying drawings, throughout which like reference letters indicate corresponding parts in the various figures. The example embodiments herein will be better understood from the following description with reference to the drawings, in which:

FIG. 2 is a flow diagram illustrating a method for controlling the RAID operations of a flash storage device using a RAID meta store area, according to at least one example embodiment;

DETAILED DESCRIPTION

Figure 1A:
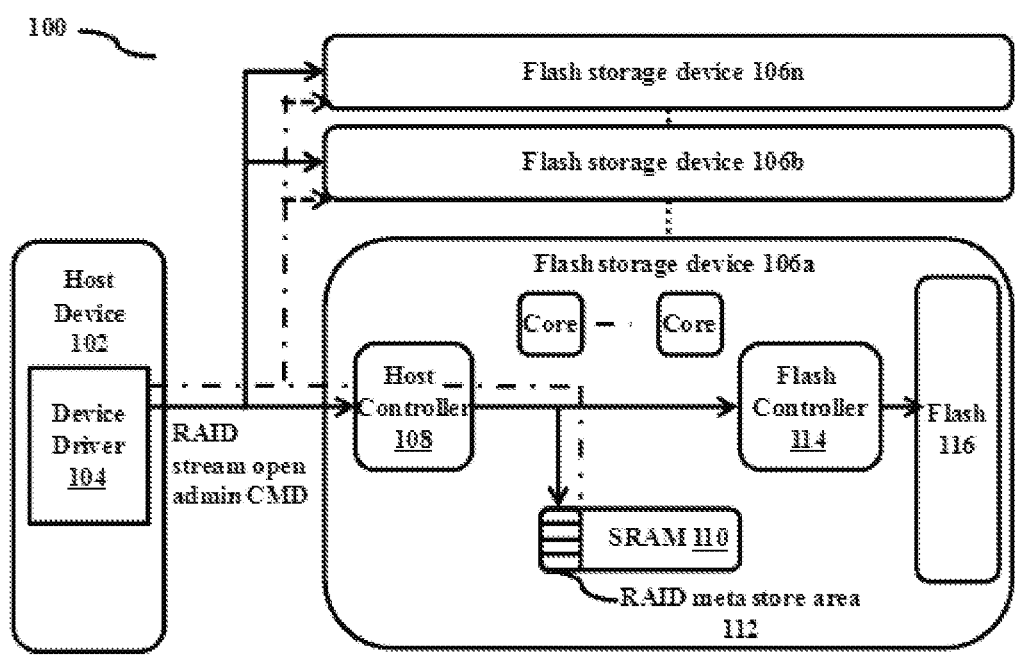
FIGS. 1a and 1b illustrate a system in a Redundant Array of Independent Disks (RAID) environment for controlling RAID operations using I/O attribute information stored on Static RAM (SRAM) of flash storage devices, according to at least one example embodiment.

The example embodiments herein and the various features and advantageous details thereof are explained more fully with reference to the non-limiting example embodiments that are illustrated in the accompanying drawings and detailed in the following description. Descriptions of well-known components and processing techniques are omitted so as to not unnecessarily obscure the example embodiments herein. The examples used herein are intended merely to facilitate an understanding of ways in which the example embodiments herein may be practiced and to further enable those of skill in the art to practice the example embodiments herein. Accordingly, the examples should not be construed as limiting the scope of the example embodiments herein.

One or more of the example embodiments herein achieve methods, apparatuses, systems, and/or non-transitory computer readable media for controlling Redundant Array of Inexpensive Disks (RAID) operations of a flash storage device in a RAID environment. According to at least one example embodiment, a method for controlling the RAID operations of a flash storage device in a RAID environment includes receiving, by the flash storage device, Input/Output (I/O) attribute information of a RAID operation in an I/O command from a host device. Further, the I/O attribute information, present (e.g., included) as a tag field within the I/O command, is stored in a RAID meta store area of a different memory area and/or different memory type (e.g., Static :RAM (SRAM) memory, and/or other volatile RAM memory types, etc.) present in the flash storage device. Only the data in the I/O command is stored in the flash storage area of the storage device. Thus, by writing and/or storing the I/O attribute information in the SRAM rather than in the flash memory of the flash storage device, the number of write operations to the flash is reduced and the flash device storage performance is improved.

The RAID meta store area is reserved on the flash storage device upon receiving a stream open admin command from the host device. When certain events are detected, such as the occurrence of a sudden power off event, the RAID controller may flush the I/O attribute information along with the metadata of the flash storage device stored in the RAID meta store area to the flash memory on the detection and/or occurrence of the sudden power off event. Furthermore, according to some example embodiments, the I/O attribute information that is flushed to the flash memory on the detection and/or occurrence of a sudden power off event may be transferred to the host device upon receiving an I/O attribute retrieve command from the host device. The host device later performs data correction for one or more flash storage devices in the system based on the I/O attribute information received from each flash storage device of the RAID environment.

Also, since information about a plurality of RAID operations, such as the I/O attribute information, is only written to the flash memory at certain desired times, such as only on the occurrence of a sudden power off event, the write amplification factor provided by the method proposed is low. In other words, the number of write operations to the flash memory is reduced in comparison to conventional RAID technologies, and thus results in effectively better and/or increased life span of the flash storage devices included in the RAID system.

In at least one example embodiment, the flash storage device can be a Solid State Device (SSD) such as Non-Volatile Dual In-line Memory Module-F (NVDIMM-F), a NVM Express (NVMe), and the like.

Referring now to the drawings, and more particularly to FIGS. 1 through 4, where similar reference characters denote corresponding features consistently throughout the figures, there are shown various example embodiments.

Figure 1B:
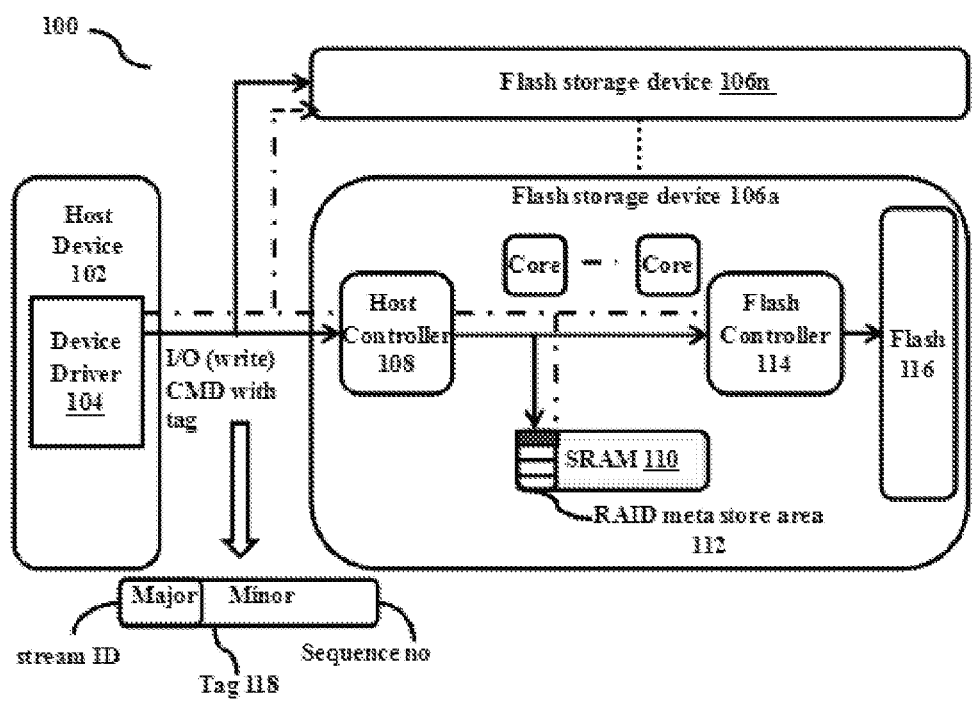

FIG. 1a and 1b illustrate a system 100 in the RAID environment for controlling RAID operations using I/o attribute information stored on a separate memory area (e.g., Static RAM (SRAM)) of the flash storage device, according to at least one example embodiment.

In at least one example embodiment, the RAID environment of system 100 depicted in FIG. 1a comprises at least one host device 102 (e.g., a personal computer (PC), laptop, server, other computing device, etc.) communicating with an array of flash storage devices 106a. 106b . . . through 106n. The FIG. 1a describes the system 100 with respect to a single flash storage device 106a for the sake of brevity, however it can be understood that the communication between the host device 102 and the flash storage devices 106b through 106n is similar to the communication explained below for the flash storage device 102. The flash storage device 106a includes a host controller 108 configured to carry out RAID operations, such as an I/O (read/write) command, through a device driver 104 for applications running on the host device 102. The host device 102 can be configured to issue a RAID stream open admin command (CMD), or the like. The command structure may be dependent on the protocol to which it is applied. On receiving the RAID stream open admin command, the host controller can be configured to reserve a RAID meta store area 112 within a separate memory section (e.g., SRAM 110) of the flash storage device 106a. The RAID meta store area 112 can be used in circular buffer manner for storing metadata (I/O attribute information) of the I/O operations, but is not limited thereto.

Once the RAID meta store area 112 is reserved, the device driver 104 can be configured to readily interact with the host controller 108 for data write/read operations through desired and/or pre-defined protocols using I/O commands, The system 100 configures the device driver 104 to include the I/O information attribute field, referred to as a tag (e.g., tag 118), in addition to the existing information included in the I/O commands. The existing information may include RAID operation type (e.g., read/write operation, or the like), location to read/write (e.g., sector number) and location where data is present or is to be read from, etc. Thus, the I/O command includes at least two fields comprising the tag 118 and a data field for actual data.

In at least one example embodiment, the tag can be a combination of major and minor segments, such as a stream identifier (ID) and a sequence number, etc. The stream ID may represent a category of the RAID operation (e.g., a type of major segment) and the sequence number can represent an iteration inside the RAID operation (e.g., a type of minor segment that indicates the execution order of the operation). Table 1 is an example of the example contents of major and minor segments in a tag:

TABLE 1

| Major | Minor |
|---|---|
| 0x a(RAID 0) | 0, 1, 2, 3, 4, 5 . . . |
| 0x b(RAID 1) | 0, 1, 2, 3, 4, 5 . . . |
| 0x c(RAID 2) | 0, 1, 2, 3, 4, 5 . . . |
| 0x d(RAID 5) | 0, 1, 2, 3, 4, 5 . . . |
| 0x e(RAID 6) | 0, 1, 2, 3, 4, 5 . . . |

Thus, the I/O command received from the device driver 104 during the RAID operation comprises at least the tag and the data according to at least one example embodiment, but is not limited thereto. For every I/O command received from the host device 102, the host controller 108 can be configured to extract I/O attribute information of the RAID operation (e.g., metadata related to the RAID operation) from the I/O command and store it in the RAID meta store area 112 as shown in FIG. 1b. The I/O attribute information is extracted by decoding the tag. Further, the host controller 108 can be configured to store the data in flash memory 116, which is controlled by a flash controller 114. The storing of the I/O attribute information to the RAID meta store area 112 and data to the flash memory 116 during the RAID operation is explained with an example in conjunction with FIG. 3.

Further, on the occurrence of a sudden power off event, the host controller 108 can be configured to flush the I/O attribute information (e.g., decoded tag 118) along with the meta data of the flash storage device from the separate memory section (e.g., SRAM 110) to the flash memory 116. Additionally, the host controller 108 can be configured to provide the I/O attribute information flushed to the flash memory 116 to the host device 102 upon receiving an I/O information retrieve command. For example, the I/O information retrieve command, such as a 'get feature' command, can be introduced in the protocol, which reads the stored I/O attribute information from the flash memory 116 of the flash storage device 106a. The host device 102 can be configured to verify the state of each flash storage device, e.g., flash storage devices 106a through 106n, to identify the state of each flash storage device and perform data correction as required, With the occurrence of a sudden power off event (e,g., from power failure, a user pressing the power or reset button on a computer, etc.), flushing of the tag to the flash 116 and retrieving of the tag information for data correction is explained with an example in conjunction with FIG. 4.

FIG. 2 is a flow diagram illustrating a method 200 for controlling the RAID operations the flash storage device 106a using the RAID meta store area, according to at least one example embodiment.

According to at least one example embodiment, step 202 of the method 200 includes the host controller 108 reserving a RAID meta store area 112 for the RAID operations in the separate memory section (e.g., SRAM 110) of the flash storage device 106a upon receiving a. RAID stream open admin command from the host device 102. as depicted in FIG. 1a. At step 204, the host controller 108 receives an I/O command for the RAID operation from the host device 102. The I/O command comprises data and the tag 118 as depicted in FIG. 1b. At step 206, the host controller 108 extracts I/O attribute information, corresponding to the RAID operation, from the I/O command by decoding the tag received in the I/O command. At step 208, the host controller 108 stores the I/O attribute information decoded from the tag 118 in the RAID meta store area 112 and the data in the flash memory 116 of the flash storage device 106a as depicted in FIG. 1b.

Figure 3:
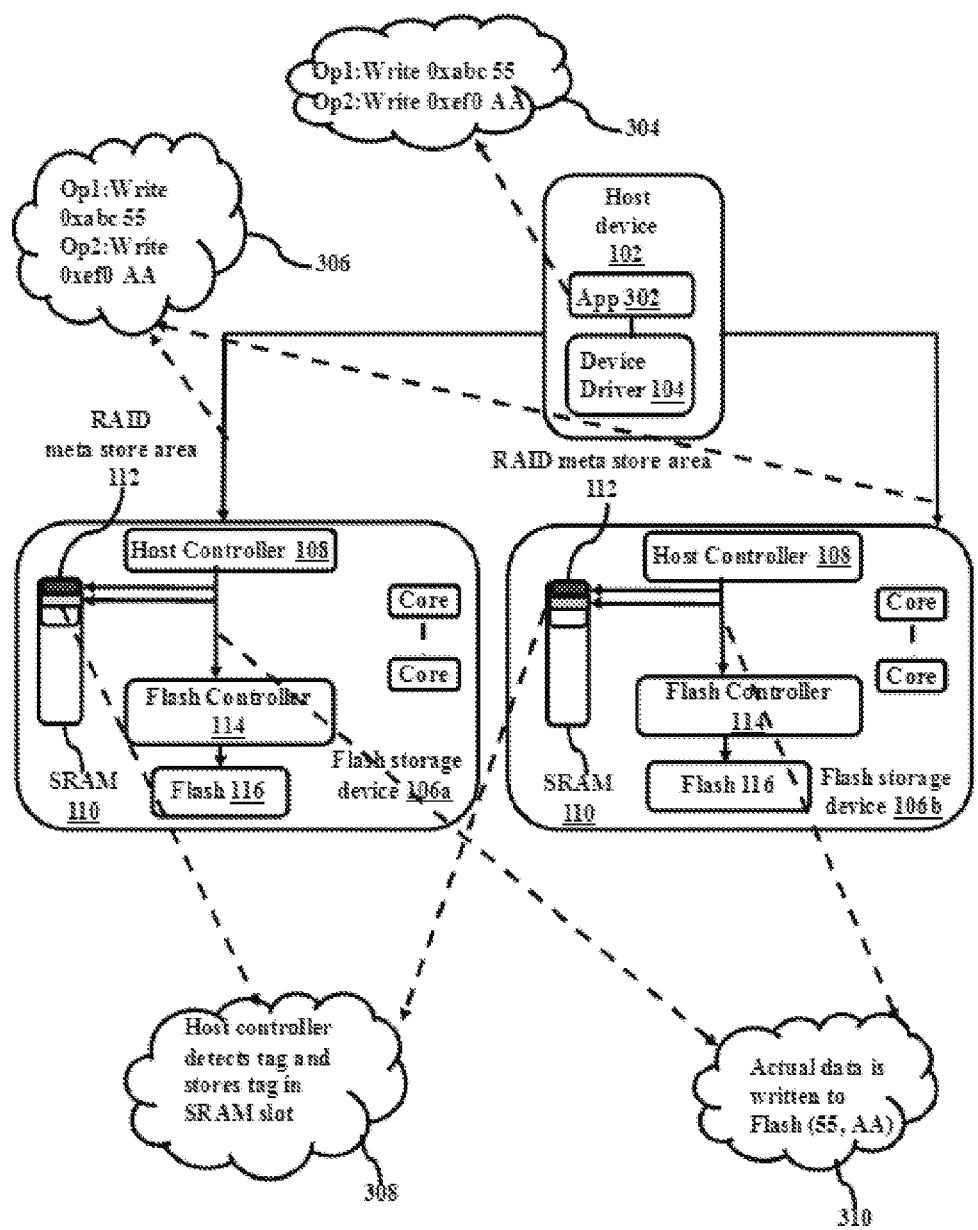
FIG. 3 is an example illustrating RAID operations controlled by the flash storage device for received Input/Output (I/O) commands using the RAID meta store area, according to at least one example embodiment.

The storing of the I/O attribute information to the RAID meta store area 112 and data to the flash memory 116 during the RAID operation is explained with an example in conjunction with FIG. 3. On occurrence (and/or detection) of a sudden power off event, at step 210, the method 200 includes allowing the host controller 108 to flush the I/O attribute information (e.g., decoded tag 118) along with the metadata of the flash storage device from the separate memory section (e.g., SRAM 110) to the flash memory 116. Further, on receiving the I/O information retrieve command from the host device 102, the host controller 108 provides the I/O attribute information, flushed to the flash memory 116, to the host device 102. On the occurrence (and/or detection) of a sudden power off event, flushing of tag information to the flash memory 116 occurs and the retrieving of the tag information for data correction is performed and will be explained with reference to an example in conjunction with FIG. 4. Referring back to FIG. 2, in at least one example embodiment, the method 200 may allow the host controller 108 to receive the 'get feature' command which enables the host device 102 to read the stored I/O attribute information from the flash memory 116. The host device 102 can be configured to verify the state of each flash storage device of a plurality of flash storage devices, e.g., flash storage devices 106a through 106n, to identify the state of each flash storage device and perform data correction as required.

The various actions in method 200 may be performed in the order presented, in a different order, or simultaneously. Further, in some example embodiments, some actions listed in FIG. 2 may be omitted and/or other unlisted actions performed. Additionally, while the description of method 200 refers to the example embodiments depicted in FIGs. 1a and 1b, the example embodiments are not limited thereto and the method may be applied to other RAID environments.

FIG. 3 is an example diagram illustrating RAID operations controlled by the flash storage device for received I/O commands using the RAID meta store area according to at least one example embodiment. The example depicted in FIG. 3 illustrates a RAID 1 mirroring system with two flash storage devices 106a and 106b present in the RAID array. In the example, the RAID operation is performed for the I/O (write) command for an application (e.g., App) 302 running on the host device 102. The I/O (write) command operation 1 can be "Write 0xabc 55," which includes the data '55' to be written to the flash storage device 106a and the I/O attribute information for the write operation (decoded from tag 118) '0xabc' that provides metadata of the write operation. Similarly, RAID operation 2 can be a write operation, wherein the I/O command for the write operation issued by the device driver 104 includes "Write 0xef0 AA," where, '0xe0' is the I/O attribute information and 'AA' is the data. Both of the example Write operations are mirrored and hence written to both flash storage devices 106a and 106b, respectively. Thus, the host controller 108 present in each of the flash storage devices 106a and 106b store the I/O attribute information (0xabc and 0xef0) in their corresponding RAID meta store area 112 and data (55 and AA) in the corresponding flash memories 116. While the operations illustrated in FIG. 3 only depict Write operations, the example embodiments are not limited thereto and may be any RAID I/O operation.

Figure 4:
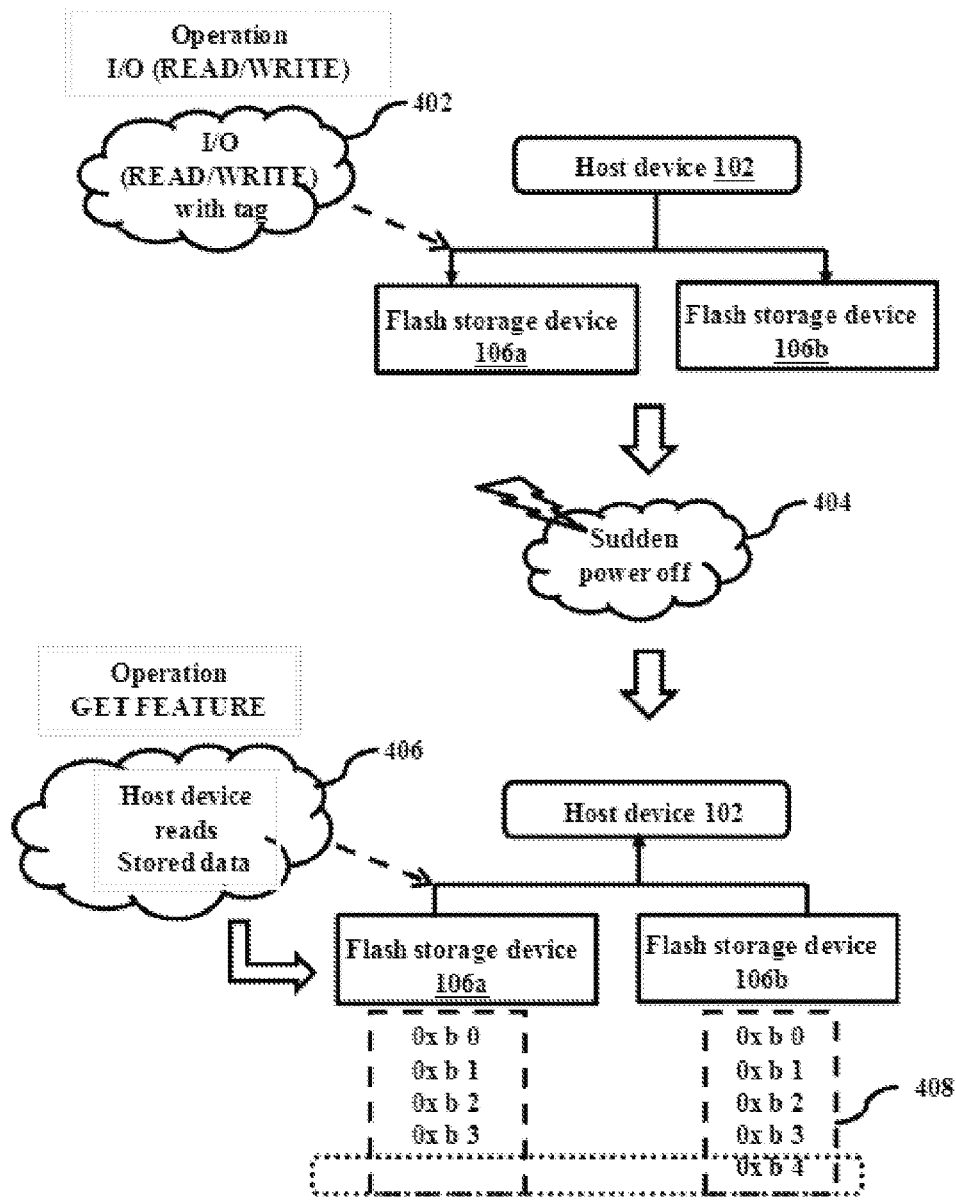
FIG. 4 is an example illustrating RAID operations controlled by the flash storage device to enable the host device to perform data correction in case of a sudden power off event, according to at least one example embodiment.

FIG. 4 is an example diagram illustrating RAID operations controlled by the flash storage device to enable the host device to perform data correction in case of a sudden power off event according to at least one example embodiment, but is not limited thereto. In the example illustrated in FIG. 4, the host device 102 stores the tag and data of RAID operations, such as I/O (read/write) operations (402), in the flash storage device 106a and 106b respectively in a RAID1 set up. After a sudden power off event (e.g., event 404), the host device 102 attempts to retrieve the tag information flushed to the flash memory 116 using the I/O attribute information retrieve command (e.g., 406), such as a get feature command. On executing the get feature command, the host device 102 can detect or retrieve information from the I/O attribute information (408) flushed to the flash memory 116 of each of the flash storage devices 106a and 106b. The information can indicate, for example:

1. The RAID operation that was in progress before the power off was RAID1 (retrieved using the information from the major segment (e.g., "0xb"));
2. Flash storage devices 106a and 106b respectively involved in the RAID1 set up are in an inconsistent state, for example where the flash storage device 106a has not completed the 4th operation and flash storage device 106b has completed 4th operation.

Based on the information retrieved from the I/O attribute information flushed to the flash memory 116, the host device 102 may execute data correction operations and/or other I/O operations based on the RAID scheme being used. For example, in RAID 1, all flash storage devices in the RAID1 setup should be in the same state (e.g., the data in one storage device must be the same as the data in the other storage devices in the RAID system), the host device 102 can either redo the 4th operation in flash storage device 106a or undo the $4^{th}$ operation in flash storage device 106b.

The example embodiments disclosed herein can be implemented through at least one software program running on at least one hardware device and performing network management functions to control the network elements. The network elements shown in FIG. 1 through FIG. 4 include blocks which can be at least one of a hardware device, or a combination of a hardware device and software module.

The foregoing description of the specific example embodiments will so fully reveal the general nature of the example embodiments herein that others can, by applying current knowledge, readily modify and/or adapt for various applications such specific example embodiments without departing from the generic concept, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while certain example embodiments have been discussed herein, those

What is claimed is:

1. A method for controlling Redundant Array of Inexpensive Disks (RAID) operations performed by at least one flash storage device, the method comprising,
   receiving an Input/Output (I/O) command for a RAID operation from a host device, the I/O command including data corresponding to the I/O command and a tag;
   extracting I/O attribute information of the RAID operation from the tag;
   storing only the extracted I/O attribute information in a RAID meta store area of the at least one flash storage device, the RAID meta store area located on Static Random Access Memory (SRAM) included in the flash storage device;
   storing the data included in the I/O command to flash memory included in the at least one flash storage device; and
   performing an I/O operation using the flash memory based on the tag and the data,
   wherein the I/O attribute information corresponding to the tag comprises a stream identifier (ID) providing category information of the RAID operation, and a sequence number indicating executing order information of the RAID operation.

2. The method as claimed in claim 1, the method further comprising:
   detecting an occurrence of a sudden power off event; and flushing the I/O attribute information along with meta data of the flash storage device from the SRAM to the flash memory based on the detected sudden power off event.

3. The method as claimed in claim 2, the method further comprising:
receiving a retrieve I/O attribute information command from the host device; and
transmitting the I/O attribute information flushed to the flash memory to the host device, wherein the I/O attribute information is used by the host device for data correction related to the occurrence of the sudden power off event.

4. The method as claimed in claim 1, the method further comprising:
receiving a RAID stream open admin command from the host device; and
reserving the RAID meta store area in at least a portion of the SRAM.

5. A method for operating a plurality of flash storage devices in a Redundant Array of Inexpensive Disks (RAID) configuration, the method comprising:
reserving a RAID meta store area on a volatile memory section on each of the plurality of flash storage devices in the RAID configuration;
receiving a RAID input/output (I/O) operation from at least one host device, the I/O operation including tag information and data;
determining I/O attribute information based on the tag information, the I/O attribute information including metadata related to the RAID I/O operation;
writing only the determined I/O attribute information to the reserved RAID meta store area on at least one of the plurality of flash storage devices; and
performing the RAID I/O operation on non-volatile memory section included in at least one of the flash storage devices based on the tag information and the data,
wherein the I/O attribute information corresponding to the tag comprises a stream identifier (ID) providing category information of the RAID operation, and a sequence number indicating execution order information of the RAID operation.

6. The method of claim 5, further comprising:
determining whether a sudden power off event has occurred; and
writing, in at least one of the plurality of flash storage devices, contents of the reserved RAID meta store area into the non-volatile memory section based on results of the determining whether the sudden power off event has occurred.

7. The method of claim 6, further comprising:
receiving a retrieve I/O attribute information command from the host device; and
transmitting the contents of the reserved RAID meta store area from the non-volatile memory section in at least one of the plurality of flash storage devices to the host device.

8. The method of claim 5, wherein
the volatile memory section is random access memory (RAM); and
the non-volatile memory section is flash memory.

9. The method of claim 5, wherein each of the plurality of flash storage devices is one of a Non-Volatile Dual In-line Memory Module-F (NVDIMM-F) flash storage device or a NVM Express (NVMe) flash storage device.

* * * * *